United States Patent [19]
Noguchi et al.

[11] 4,131,086
[45] Dec. 26, 1978

[54] FUEL REFORMING APPARATUS FOR USE WITH INTERNAL COMBUSTION ENGINE

[75] Inventors: Masaaki Noguchi, Nagoya; Tsuchio Bunda, Okazaki; Taro Tanaka, Chiryu, all of Japan

[73] Assignee: Nippon Soken, Inc., Nishio, Japan

[21] Appl. No.: 596,743

[22] Filed: Jul. 17, 1975

[30] Foreign Application Priority Data

Jul. 20, 1974 [JP] Japan .................... 49-83693
Jul. 22, 1974 [JP] Japan .................... 49-84345
Dec. 26, 1974 [JP] Japan .................... 50-2053

[51] Int. Cl.$^2$ .................... F02B 43/08; F02M 31/04
[52] U.S. Cl. .................... 123/3; 123/122 G; 123/DIG. 12
[58] Field of Search ............ 123/1 A, 3, 25 R, 119 E, 123/122 G, DIG. 12; 48/107, 212, 94, 213, 214, 215, 93; 23/288 R, 281

[56] References Cited

U.S. PATENT DOCUMENTS

| | | | |
|---|---|---|---|
| 1,609,296 | 12/1926 | Good | 123/122 G |
| 1,687,918 | 10/1928 | Woolson | 123/122 G |
| 1,722,288 | 7/1929 | Good | 123/122 G |
| 2,057,808 | 10/1936 | Widegren | 123/122 G |
| 2,767,233 | 10/1956 | Mullen | 48/212 |
| 3,415,634 | 12/1968 | Dent | 48/213 |
| 3,713,794 | 1/1973 | Maher | 48/107 |
| 3,717,129 | 2/1973 | Fox | 123/3 |
| 3,798,005 | 3/1974 | Koch | 48/107 |
| 3,849,087 | 11/1974 | Arakawa | 48/214 A |
| 3,915,125 | 10/1975 | Henkel | 123/3 |
| 3,954,423 | 5/1976 | Hamper | 123/3 |

Primary Examiner—Charles J. Myhre
Assistant Examiner—Craig R. Feinberg
Attorney, Agent, or Firm—Cushman, Darby & Cushman

[57] ABSTRACT

A fuel reforming apparatus for use with an internal combustion engine, comprising hydrocarbon fuel supply means for producing a mixture of hydrocarbon fuel with air in a suitable air-fuel ratio, a burning chamber in which the mixture is ignited and burned, and a reactor which is packed with a catalyst adapted to carry out the catalytic reforming, with the aid of the heat of the combustion gases discharged out of the burning chamber, of the hydrocarbon fuel including little air to produce a reformed gas rich with hydrogen.

8 Claims, 9 Drawing Figures

FUEL REFORMING APPARATUS FOR USE WITH INTERNAL COMBUSTION ENGINE

BACKGROUND OF THE INVENTION

The present invention relates to a fuel reforming apparatus especially adapted for use with an internal combustion engine, the apparatus including a burning chamber and a catalytic reactor for converting the hydrocarbon fuel into a reformed gas which may be easily burned in the internal combustion engine, whereby the ignitibility and combustibility of the fuel as well as the fuel consumption may be considerably improved and toxic gas emission may be minimized.

In order to minimize toxic gas emission, in both conventional internal combustion engines and stratified combustion engines, it has been required to atomize and evenly distribute the fuel into the cylinders of the engine. For this purpose, there have been devised and demonstrated various fuel supply systems for heating and vaporizing use of fuel by the hot cooling water or exhaust gases, but they have a common defect that the efficient and effective vaporization of the fuel cannot be attained under all the operating conditions of the engine.

High-octane fuel for internal combustion engines contains aromatic hydrocarbons and lead compounds so that toxic gases are produced and emitted, presenting serious atmospheric pollution problems.

The present invention was made to overcome the above and other problems, and a first feature of the present invention resides in the fact that a fuel reforming apparatus includes a burning chamber wherein a part of a hydrocarbon fuel to be charged into the engine is burned in a suitable air-fuel ratio, and a catalytic reactor which is packed with a suitable catalyst adapted to carry out catalytic reformation with the aid of the heat of the combustion gases from the burning chamber, of the hydrocarbon fuel under the condition that almost no oxygen is present in the reactor, thereby producing a reformed gas rich with hydrogen which may be further mixed with the raw hydrocarbon fuel to be charged into the engine. Therefore, a first object of the present invention is to make the engine operate with a relatively lean air-fuel mixture, thereby minimizing toxic gas emission.

A second feature of the present invention resides in the fact that both the combustion gases discharged from the burning chamber and the hydrocarbon fuel are reformed within the catalytic reactor. Therefore, in addition to the first object described above, the present invention has a second object to suppress the production of carbon to a minimum in the catalytic reforming process in the catalytic reactor.

A third feature of the present invention resides in the fact that the hydrocarbon fuel and water supplied through an independent water supply system are charged into the catalytic reactor to be converted into a reformed gas. Therefore, the present invention has a third object, in addition to the first object, to positively suppress the production of carbon in the catalytic reforming process in the catalytic reactor.

In existing chemical plants, partial oxidation, steam reforming and thermal cracking methods have been used together with catalysts to convert hydrocarbons into reformed gas, and the fuel reforming apparatus in such plants are stationary and are operated under steady state conditions so that the control of the quantity of hydrocarbon fuel supply and the control of the reaction temperature can be attained in a simple manner. Furthermore, the heat source may be controlled easily and the reaction conditions may be adjusted in a simple manner. Moreover, the installation space of the apparatus is not critical. However, in the case of the fuel reforming apparatus for use with internal combustion engines, the operating conditions change from time to time, and so do the reaction conditions. Furthermore, it is extremely difficult to provide sufficient heat when the engine is started. According to the present invention, however, a part of the hydrocarbon fuel is burned so that when the engine is started, the fuel reforming apparatus may be immediately raised to a high temperature sufficient to continuously carry out catalytic reformation. Moreover, the fuel reforming apparatus in accordance with the present invention is compact in size and light in weight, and the reaction temperature may be controlled in a simple manner.

According to the present invention, a part of a hydrocarbon fuel is mixed with air to provide a combustion mixture in a suitably combustible air-fuel ratio so that the combustion mixture may be ignited and burned within a burning chamber without producing any soot or carbon. Soot or carbon will poison the catalyst in a reactor so that the air-fuel ratio of the combustion mixture must be selected depending upon the construction of the burning chamber, the vaporization of the hydrocarbon fuel, and so on. The heat of the combustion gases is used to heat the catalytic reactor so that the catalyst in it may be maintained at a suitable temperature. Furthermore, the combustion gases are charged into the reactor so that the hydrocarbon fuel may be converted into a reformed gas within the reactor without the presence of excessive oxygen or air. Alternatively, the combustion gases from the burning chamber may be discharged into the air intake system or the exhaust manifold of the engine. The quantity of the combustion mixture to be charged into the burning chamber is so selected that the heat enough to heat the catalytic reactor to a desired reaction temperature may be generated.

The hydrocarbon fuel charged into the catalytic reactor is made to contact with the catalyst packed within the catalytic reactor to be converted into a reformed gas rich with hydrogen with the aid of the heat of the combustion gases. Alternatively, a mixture of the hydrocarbon fuel and burning gases from the combustion chamber is charged into the reactor to be converted into a reformed gas. In the latter case, care should be taken so that the hydrocarbon fuel may not be exposed directly to the combustion flames. In other words, the hydrocarbon to be reformed must not be charged together with the combustion mixture into the burning chamber. Otherwise, soot is produced and is attached to the catalyst in the reactor, thereby adversely affecting the service life of the catalyst. The short service life of the catalyst presents a very serious problem especially in the case of the fuel reforming apparatus mounted on a vehicle for the purpose of reducing toxic gas emission from the engine. When a rich mixture of hydrocarbon fuel and air is charged into the burning chamber in order to burn only a fraction of it, there will be produced layers of combustion gases and the rich mixture in the burning chamber. As a result, in one layer, the supply of oxygen will be insufficient while in the other layer, the supply of oxygen will be excessive so that large amounts of soot or carbon may be produced. In order to overcome these problems, according to the present invention, hydrocarbon fuel is mixed with the combustion gases from the burning chamber downstream thereof so that the hydrocarbon fuel may be prevented from being directly exposed to the combustion flames and may be uniformly mixed with the combustion gases before it is charged into the catalytic reactor.

According to the present invention, the fuel reforming process carried in the catalytic reactor causes essentially an endothermic reaction with little air or with little oxygen being introduced into the catalytic reactor so that thermal runaway may be prevented. Therefore, it is essential that a combustion mixture with a suitable air-fuel ratio must be ignited and burned in the burning chamber, and that hydrocarbon fuel must be charged into the catalytic reactor in such a way that little oxygen or air may be introduced into the catalytic reactor. It is preferable that the temperature of the endothermic reaction be maintained in a range between 500° and 800° C. In order to stabilize the reaction within the catalytic reactor, to relax the reaction conditions and to improve the conversion efficiency, it is preferable to use a catalyst such as nickel, cobalt, chromium, platinum, rhodium or the mixture thereof. Whatever the type of the catalyst used, it is essential that the catalyst should convert the hydrocarbon fuel into a reformed gas rich with hydrogen.

As described above, according to the present invention, a reformed gas rich with hydrogen may be obtained, and the combustion of hydrogen is about 8 times as fast as that of conventional gasoline fuel so that the combustion efficiency in the internal combustion engines may be much improved. More particularly, a lean combustion mixture, which has been hitherto impossible to ignite and burn in an internal combustion engine with a carburetor, can be positively ignited and burned so that toxic gas emission may be minimized and fuel consumption may be considerably improved. As compared with the fuel which is atomized and vaporized by conventional carburetors, the reformed gas may be more evenly distributed among the cylinders of an engine because the reformed gas is completely in the form of a gas. Therefore, toxic gas emission may be further minimized. Although conventional high-octane fuel contains aromatic hydrocarbons and lead compounds which are harmful to persons, the reformed gas does not require any aromatic hydrocarbon and lead compounds, because the reformed gas itself changes into high-octane fuel. Therefore, any hydro-carbon such as naphtha may be advantageously used. This means that the fuel may be selected from a wide range of various hydrocarbons.

BRIEF DESCRIPTION OF THE DRAWING

Similar reference numerals are used to designate similar parts throughout the figures.

DESCRIPTION OF THE PREFERRED EMBODIMENTS

First Embodiment, FIGS. 1 through 4

Figure 1:
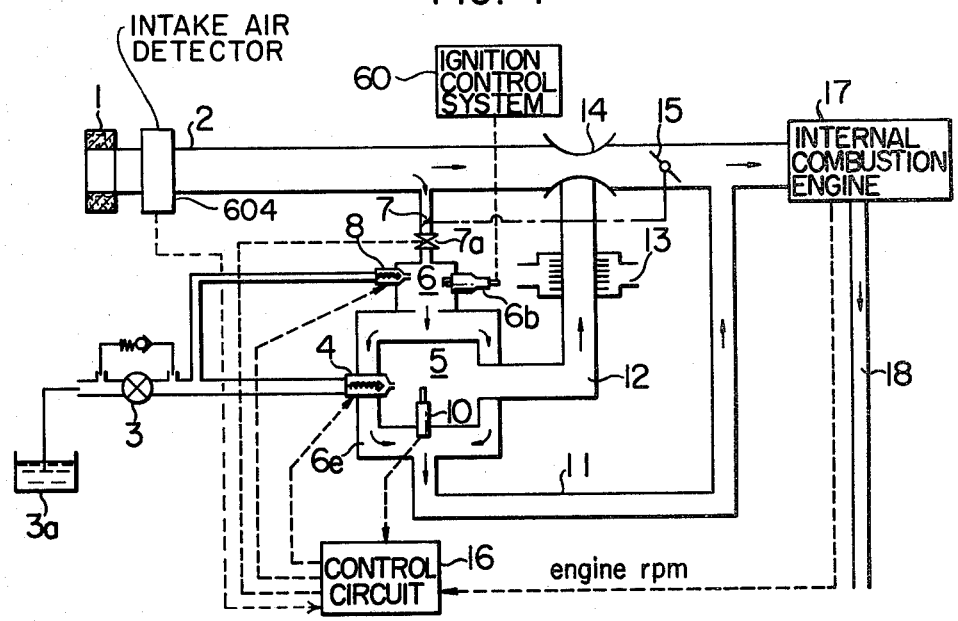
FIG. 1 is a schematic diagram of a first embodiment of a fuel reforming apparatus in accordance with the present invention.

Referring to FIG. 1 illustrating a schematic diagram of the first embodiment of a present invention, reference numeral 1 denotes an air filter for cleaning air to be charged into an internal combustion engine; 2, an air intake; 3, a fuel pump for pumping and feeding a hydrocarbon in a fuel tank 3a under a predetermined pressure; 4, a fuel injection valve which is adapted to control a fuel injection under the control of a control circuit 16, which will be described in detail hereinafter, in response to the operating conditions of the engine; that is, an opening degree of a throttle valve, a rotational speed of the engine, an intake air quantity, and so on; 5, a catalytic reactor packed with a catalyst for effecting an efficient and quick catalytic reformation of the fuel into a reformed gas containing a large quantity of hydrogen which may be easily ignited and burnt, the catalyst being nickel, chromium, rhodium, platinum, cobalt, and mixtures thereof; 6, a burning chamber for supplying heat to a reactor 5 so that a catalyst reaction temperature therein may be maintained, a part of the hydrocarbon fuel and a part of the intake air being mixed in a suitable ratio and being burned without producing any soot, the optimum air-fuel ratio being about 7 to 15 when the hydrocarbon fuel is gasoline; that is, 0.5 to 1.0 in terms of the excess air ratio $\lambda$, the above range being also applied to other hydrocarbon fuels, 6b; an ignition plug electrically connected to a conventional ignition control system 60 including an interruptor, a coil and so on; 7, a butterfly valve interlocked with a throttle valve 15 for controlling the quantity of the air to be charged into the burning chamber 6; 7a, a stop valve for interrupting or reducing the charge of the air into the burning chamber 6 when the temperature of the catalytic reactor 5 rises abnormally high; 8, a fuel injection valve which injects the hydrocarbon fuel into the burning chamber 6 under the control of the control circuit 16; 6e, a heat exchange chamber with which the catalytic reactor 5 is heated by the heat of the combustion gases discharged out of the burning chamber 6; 10, a temperature sensor for detecting the temperature of the catalyst within the catalytic reactor 5 so as to transmit the signal to the control circuit 16 when the temperature of the catalyst rises abnormally high in order to prevent an abnormal temperature rise of the catalyst, thereby improving the service life thereof; 11, a gas passage communicated with the air intake 2 for discharging the combustion gases from the burning chamber 6; 12, a reformed gas passage for introducing the reformed gas produced in the catalytic reactor 5 into the air intake 2; 13, a heat exchanger interposed in the reformed gas passage 12 for cooling reformed gas of a relatively high temperature, air or cooling water of the engine being used as the heat exchange medium; 14, a mixer interposed within the air intake 2 for mixing the intake air with the reformed gas discharged out of the reformed gas pipe 12; 17, an internal combustion engine which may be of the stratified combustion or rotary type; and 18, an exhaust pipe.

Figure 2:
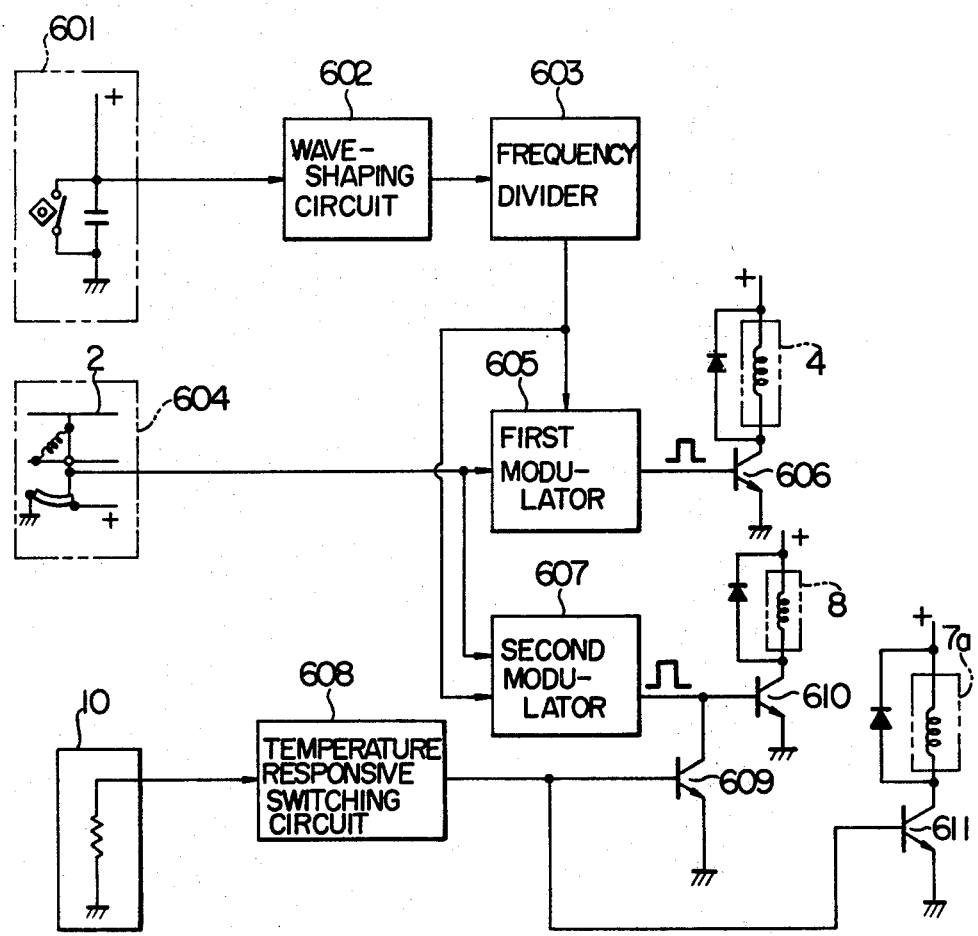
FIG. 2 is a block diagram of a control circuit (16) thereof.

FIG. 2 is a block diagram of the control circuit 16, wherein reference numeral 601 denotes a reference signal generator for generating a reference signal in synchronism with the rotation of the engine 17; 602, a waveshaping circuit for shaping the reference signal from the reference signal generator 601; 603, a frequency divider for dividing the frequency of the output reference signal from the waveshaping circuit 602; 604, an intake air detector for detecting the quantity of the intake air to the engine 17; 605, a first modulator for calculating the injection timing and the injection time for the hydrocarbon fuel in response to the output signals from the frequency divider 603 and the intake air detector 604; 606, a power transistor used for controlling the fuel injection valve 4 in response to the control signal from the first modulator 605; 607, a second modulator for calculating the fuel injection timing and injection time of the fuel injection valve 8 of the combustion chamber 6 in response to the output signals from the frequency divider 603 and the intake air detector 604; 608, a temperature responsive switching circuit which, in response to the output signal from the temperature sensor 10, generates a high- or H-level signal when the detected temperature is in excess of a predetermined level, or a low- or L-level signal when the detected temperature is lower than a predetermined level; 609, a transistor for interrupting the transmission of the output control signal from the second modulator 607 in response to the high- or H-level signal from the temperature responsive switching circuit 608; 610, a power transistor used for controlling the fuel injection valve 8 in response to the output control signal from the second 607; and 611, a transistor which is conducted in response to the high level signal from the temperature responsive switching circuit 608, thereby closing the stop valve 7a.

Next the mode of operation of the fuel reforming apparatus with the above construction will be described. The hydrocarbon fuel, which is fed under a predetermined pressure by the fuel pump 3 from the fuel tank 3a to the fuel injection valve 4, is injected in a controlled quantity into the catalytic reactor 5 by the fuel injection valve 4 which is controlled in response to the control signal from the control circuit 16. The air introduced into the burning chamber 6 is controlled in quantity by the butterfly valve 7 interlocked with the throttle valve 15 so that the air in a predetermined ratio with respect to the intake air into the engine 17 may be fed into the burning chamber 6. The hydrocarbon fuel charged into the burning chamber 6 is also controlled by the fuel injection valve 8 which in turn is controlled by the control circuit 16. Thus the air-fuel mixture in a suitable ratio is ignited by the ignition plug 6b and burned in the burning chamber without producing any soot, and the catalyst in the reactor 5 is heated by the heat of the combustion gases discharged from the burning chamber 6, whereby the temperature of the catalyst may be maintained within a suitable reaction temperature range. Thus, the catalytic reformation of the hydrocarbon fuel proceeds in the catalytic reactor 5 so that reformed gas including a large quantity of hydrogen may be obtained. Since the catalytic reformation is essentially an endothermic reaction, thermal runaway may be prevented. Even when an abnormal temperature rise should occur in the catalytic reactor 5, the output signal from the temperature responsive switching circuit 608 changes to the H-level in response to the output signal from the temperature sensor 10 so that the fuel injection nozzle 8 is kept closed while the stop valve 7a is also closed. This means that the supply of both the fuel and air to the burning chamber 6 is interrupted. Thus, the catalyst within the catalytic reactor 5 may be prevented from being heated abnormally to high temperatures, whereby the deterioration of the catalyst may be prevented. The reformed gas produced in the reactor 5 is at relatively high temperatures, but may be cooled by the heat exchanger 13 in the reformed gas pipe 12 only to such an extent that condensation of the reformed gas does not occur. The cooled reformed gas is mixed in the mixer 14 in the air intake 2 with the intake air, and the combustion mixture is charged into the cylinder in the engine 17. Because of the existence of hydrogen within the reformed gas, the combustion of the lean mixture is possible.

Within the heat exchange chamber 6e, the combustion gases from the burning chamber 6 sufficiently heat the catalytic reactor 5 and then are charged into the air intake 2 at downstream of the throttle valve 15.

Figure 3:
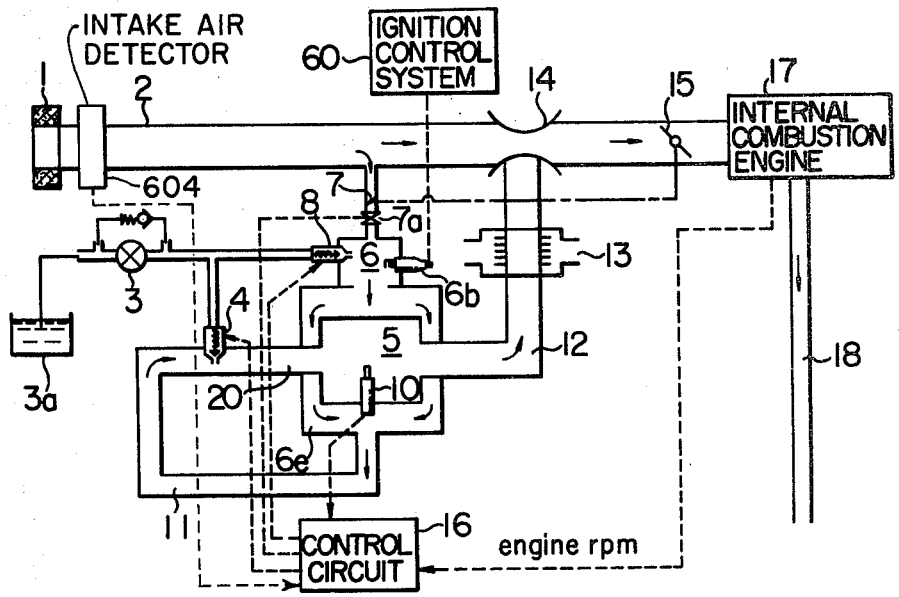
FIGS. 3 and 4 are schematic diagrams of a first and second variations of the first embodiment, respectively.

First Variation of First Embodiment, FIG. 3

In the first embodiment described so far with reference to FIGS. 1 and 2, the combustion gases from the burning chamber 6 have been described as being introduced or discharged into the air intake 2, but in the first variation of the first embodiment shown in FIG. 3, the combustion gases discharged out of the heat exchange chamber 6e are charged into the catalytic reactor 5 in order to improve the catalytic reformation of the hydrocarbon fuel in the catalytic reactor 5. For this purpose the combustion gas pipe 11 is opened into the catalytic reactor 5, and the fuel injection valve 4 is opened into the combustion gas pipe 11.

In the instant embodiment, the catalytic reformation proceeds in the catalytic reactor as follows:

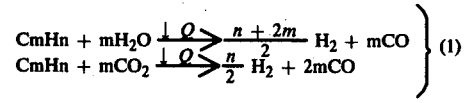 (1)

where Q = heat.

For instance, in the case of a hydrocarbon fuel having an average molecular formula

the following reactions in the burning chamber 6 and the catalytic reactor 5 are most advantageous for reforming one mol. of hydrocarbon fuel $C_7H_{11}$:

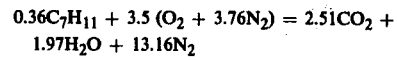

in the burning chamber 6, and

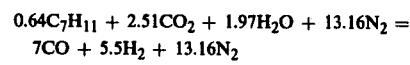

in the catalytic reactor 5.

From the above reaction formulae, the ratio of the fuels charged into the burning chamber 6 and the catalytic reactor 5 is about 1:2. Up to a maximum ratio of 1:1, the combustion efficiency may be improved by charging the reformed gas, but when the ratio exceeds 1:1, the fuel consumption as well as the contents of $H_2O$ and $CO_2$ in the reformed gas are increased disadvantageously. Both the fuel injection valve 4 and 8 are so adjusted as to meet the above conditions. The advantage of the first variation over the first embodiment resides in the fact that the production of carbon in the catalytic reformation may be considerably suppressed, whereby the service life of the catalyst in the catalytic reactor 5 may be remarkably improved.

The control circuit 16 of the first variation is substantially similar in construction to that of the first embodiment shown in FIG. 2, but it will be understood that the control circuit 16 operates a stop valve 7a in response to the output signal from the temperature sensor 10, when the temperature within the catalytic reactor 5 exceeds a predetermined value, so that the stop valve reduces the flow rate of the air flowing into the burning chamber, thereby the catalyst is prevented from reaching an abnormal temperature.

Figure 4:
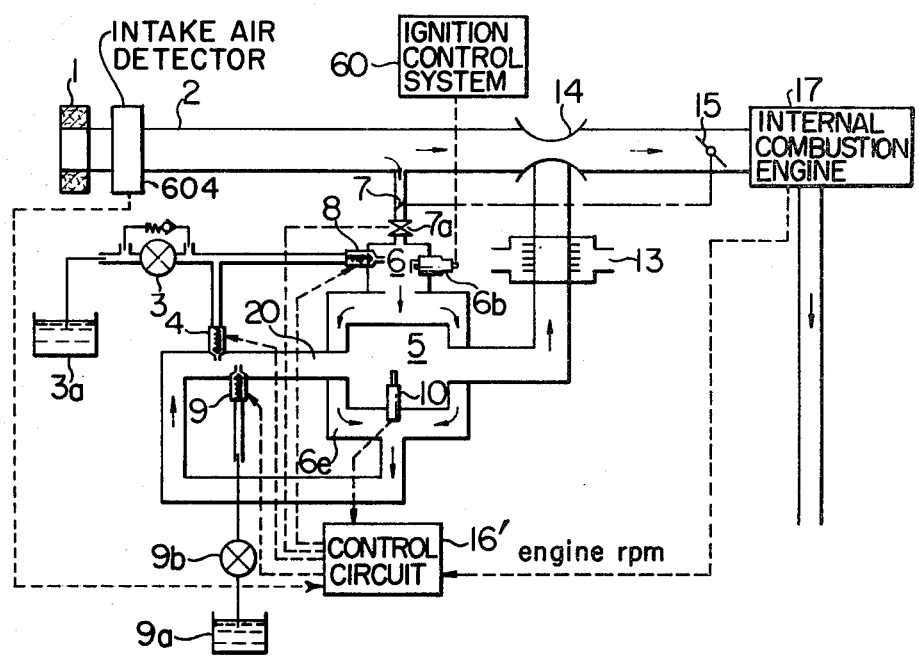

Second Variation of First Embodiment, FIG. 4

The second variation shown in FIG. 4 is substantially similar in construction to the first variation shown in FIG. 3 except that the water pumped up by a water pump 9b from a water storage tank 9a is injected through a water injection nozzle 9 into the catalytic reactor 5. The water injection nozzle 9 is controlled in response to the control signal from the control circuit 16'. The second variation also has a distinct advantage over the first embodiment shown in FIG. 1 in that the production of carbon in the catalytic reforming may be considersably suppressed.

In the first embodiment and its first and second variations, the reformed gas has been described as being charged into the cylinders of the engine, but in the case of the stratified combustion engine with an engine auxiliary combustion chamber or trap chamber, only the reformed gas or the relatively rich mixture of the reformed gas with air may be charged into the trap chamber while the relatively lean mixture of the hydrocarbon fuel with air may be charged into the main engine combustion chamber so that the reduction in the toxic compounds in the exhaust gases may be attained; sufficiently strong power may be obtained; and the fuel consumption rate may be considerably improved.

Figure 5:
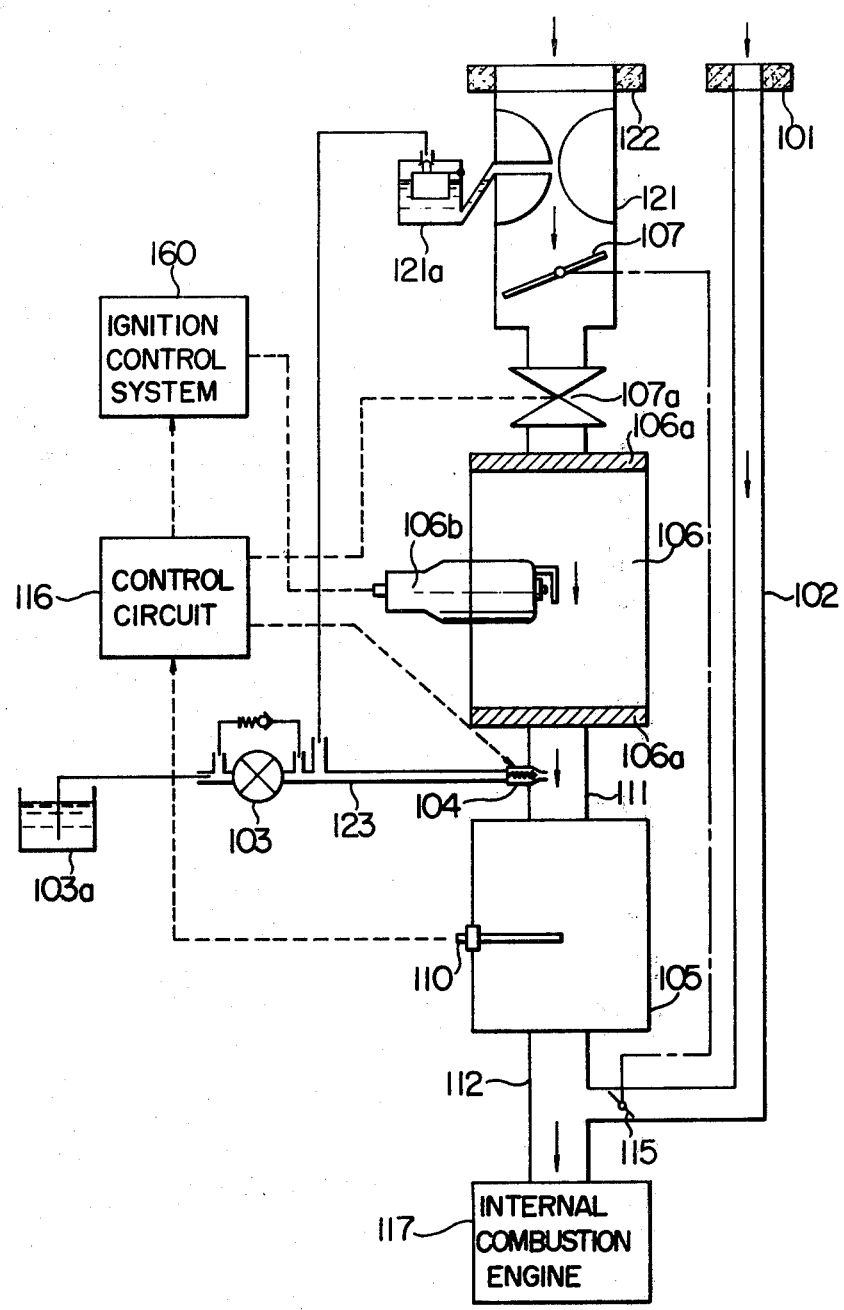
FIG. 5 is a schematic diagram of a second embodiment of the present invention.

Second Embodiment, FIG. 5

The second embodiment shown in FIG. 5 is different from the first embodiment shown in FIG. 1 in that a carburetor 121 is provided in order to charge the combustion mixture in an optimum ratio. In FIG. 5, reference numeral 101 denotes an air filter; 102, an air intake; 103, a fuel pump; 103a, a hydrocarbon fuel storage tank; 104, a fuel injection valve substantially similar in construction and operation to the fuel injection valve shown in FIG. 1; 105, a catalytic reactor packed with the catalyst for catalytic reformation of hydrocarbon fuel; 106, a burning chamber with an ignition plug 106b electrically connected to an ignition control system 160 and two flame arresters 106a disposed at the inlet and outlet ends respectively; 107, a butterfly valve interlocked with a throttle valve 115 for controlling the combustion mixture to be charged into the burning chamber 106; 107a a stop valve disposed at the downstream of the butterfly valve 107 and adapted to be actuated, when the temperature within the catalytic reactor 105 exceeds a predetermined value, in response to a control signal from the control circuit 116 to be described in detail hereinafter so that only a minimum quantity of the combustion mixture may be introduced into the burning chamber 106; 121, a carburetor with a float chamber 121a; 122, an air filter attached to the inlet of the carburetor 121; 110, a temperature sensor for detecting the temperature within the reactor 105 so as to obtain the temperature of the catalyst therein as in the case of the first embodiment, 111, a combustion gas passage or pipe for discharging the combustion gases produced in the burning chamber 106 into the catalytic reactor 105, the fuel injection valve 104 adapted to be opened into this combustion gas pipe 111; 112, a reformed gas pipe joined to the air intake 102; 115, the throttle valve of an engine 117; and 116, a control circuit substantially similar in construction and operation to the control circuit 16 shown in FIG. 2 for controlling the fuel injection valve 104 and a stop valve 107a in response to the operating conditions of the engine 117.

Next the mode of operation of the second embodiment with the above construction will be described. Air is taken into the air intake 102 through the air filter 101, and the combustion mixture with a suitable ratio produced in the carburetor 121 is charged into the burning chamber 106 where the combustion mixture is ignited by the ignition plug 106b and burned. The combustion products produced in the burning chamber 106 as well as the hydrocarbon fuel from the fuel tank 103a are charged into the reactor 105. The quantity of the hydrocarbon fuel to be introduced into the reactor 105 is controlled by the fuel injection valve 104 which in turn is controlled by the control circuit 116 in response to the signal representative of the intake air quantity. The major portion of the burning products from the combustion chamber 106 consists of water and carbon dioxide, and oxygen is almost excluded so that the hydrocarbon fuel may be reformed by the catalytic reformation as indicated by the reaction formula (1) (See First Variation). The catalytic reformation proceeds more favourably at the temperature range between 500° and 800° C. so that the quantity of the combustion mixture is controlled by the butterfly valve 107 interlocked with the throttle valve 115, thereby controlling the reacting temperature within the above range. As in the case of the first embodiment, when the temperature in the catalytic reactor 105 exceeds a predetermined value, the control circuit 116 operates the stop valve 107a in response to the output signal from the temperature sensor 110 so that the stop valve 107a reduces the flow rate of the combustion mixture flowing into the burning chamber to a minimum value. The hydrogen rich reformed gas is charged into the engine 117, whereby the combustion efficiency may be remarkably improved as in the case of the first embodiment.

Figure 6:
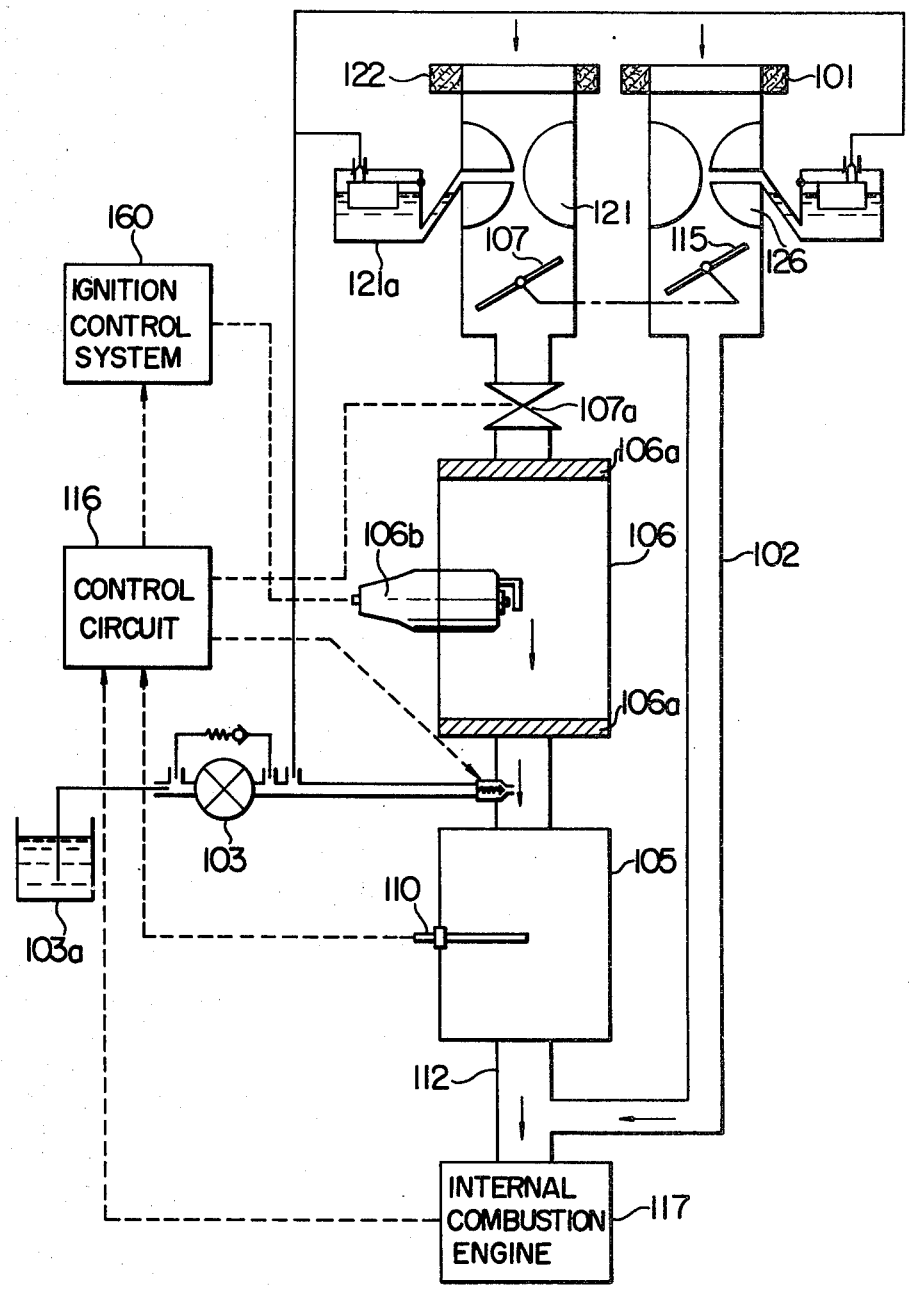
FIG. 6 is a schematic diagram of one variation thereof.

Variation of the Second Embodiment, FIG. 6

In the second embodiment described so far with reference to FIG. 5, only the reformed gas is charged into the engine 117, but in the varation shown in FIG. 6 of the second embodiment, both a relatively lean mixture of the hydrocarbon fuel with air and reformed gas are charged into the engine 117. For this purpose, a carburetor 126 is inserted into the air intake 102. This variation has an advantage over the second embodiment in that the engine output may be considerably improved as compared with the second embodiment in which only the reformed gas is charged into the engine.

Figure 7:
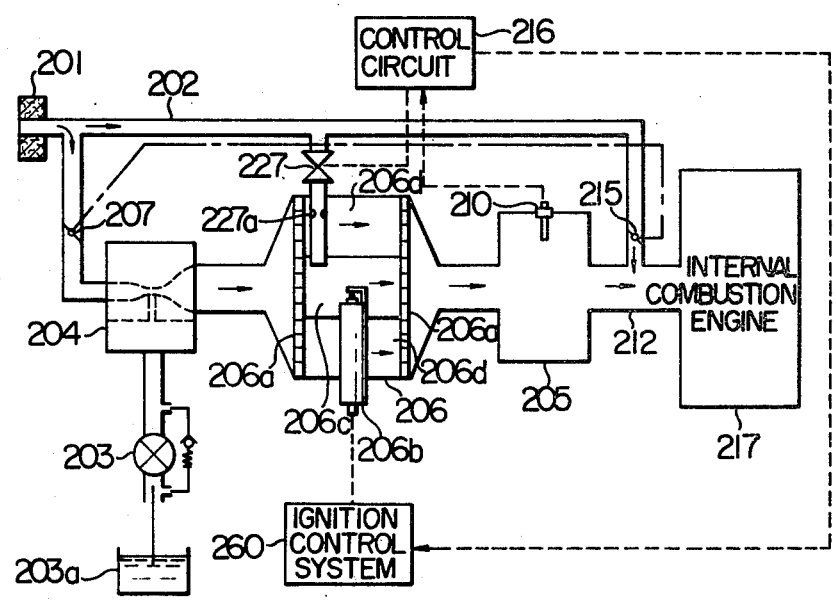
FIG. 7 is a schemcatic diagram of a third embodiment of the present invention.

Third Embodiment, FIG. 7

In the first embodiment shown in FIG. 1 both the catalytic reactor 5 and the burning chamber 6 are provided with the fuel injection valves 4 and 8, respectively, but in the third embodiment shown in FIG. 7, both the fuel injection valves 4 and 8 are eliminated and instead a carburetor 204 is provided in order to simplify the construction of the fuel or hydrocarbon fuel supply system. In FIG. 7, reference numeral 201 denotes an air filter; 202, an air intake; 203, a fuel pump; 203a, a fuel tank; 204, a carburetor for mixing the air with the hydrocarbon fuel to produce a rich mixture having an air-fuel ratio less than unity; 207, a butterfly valve interlocked with a throttle valve 215; 206, a burning chamber consisting of an inner duct or an inner combustion chamber 206c and an outer chamber 206d formed concentric with the inner combustion chamber 206c, the relatively rich mixture, from the carburetor 204, being mixed with air, ignited by an ignition plug 206b and burned within the inner duct or the inner combustion chamber 206c, whereby the combustion products (water and carbon dioxide) and heat required for catalytic reformation may be obtained; 206a, flame arrestors disposed at the inlet and outlet of the burning chamber 206; 227, a stop valve inserted in an air supply pipe to the inner combustion chamber 206c; 227a, an orifice or restrictor inserted in the air supply pipe so that the quantity of the air to be charged into the inner duct or the inner combustion chamber 206c may be controlled in response to the negative pressure in the inner combustion chamber 206c; 205, a reactor packed with a catalyst so that the catalytic reformation of the rich mixture with almost no air supplied from the carburetor 204 may be effected by the heat of the combustion products produced in the burning chamber 206 and introduced into the catalytic reactor 205; 210, a temperature sensor for detecting the temperature within the reactor 205; 216, a control circuit for controlling a stop valve 227 and an ignition control system 260 in response to the output signal from the temperature sensor 210, the mode of operation of the control circuit 216 being substantially similar to that of the first embodiment; the ignition control system 260 being also similar in construction and mode of operation to that of the first embodiment; and 212, a reformed gas pipe leading to an engine 217 and joined to the air intake 202 downstream of the throttle valve 215 inserted therein.

Next the mode of operation of the third embodiment with the above construction will be described. In response to the opening degree of the butterfly valve 207 which is interlocked with the throttle valve 215, the quantity of the intake air to be charged into the carburetor 204 is controlled. In response to the quantity of the air charged into the carburetor 204, the quantity of the hydrocarbon fuel to be charged into the carburetor 204 is also controlled so that the excessively rich combustion mixture with an air-fuel ratio of less than unity may be produced and charged into the burning chamber 206. The combustion mixture charged into the inner and outer chambers 206c and 206d is divided in a ratio depending upon the ratio between the inlet opening areas of the inner and outer chambers 206c and 206d. The excessively rich combustion mixture charged into the inner duct or the inner combustion chamber 206c is further mixed with air charged therein through the air supply pipe to the relatively lean combustion mixture with a suitable air-fuel ratio, and is ignited by the ignition plug 206b and burned. The excessively rich mixture charged into the outer chamber 206d is heated by the heat generated by the combustion within the inner duct or the inner combustion chamber 206c as the mixture flows through the outer chamber 206d, and is then charged into the catalytic reactor 205. In the catalytic reactor 205, into which are charged the heated excessively rich mixture and the combustion products from the burning chamber 206, catalytic reformation is effected so that a reformed gas rich with hydrogen may be produced. As in the case of the first and second embodiments, the reformed gas is charged into the engine 217 for combustion.

When the temperature within the catalytic reactor 205 exceeds a predetermined temperature, in response to the output signal from the temperature sensor 210, the control circuit 216 closes the stop valve 227, thereby interrupting the supply of the air into the inner duct or the inner combustion chamber 206c. thus, the combustion within the inner duct or the inner combustion chamber 206c is stopped. It should be noted that even when combustion is stopped, endothermic catalytic reforming proceeds within the catalytic reactor 205.

Figure 8:
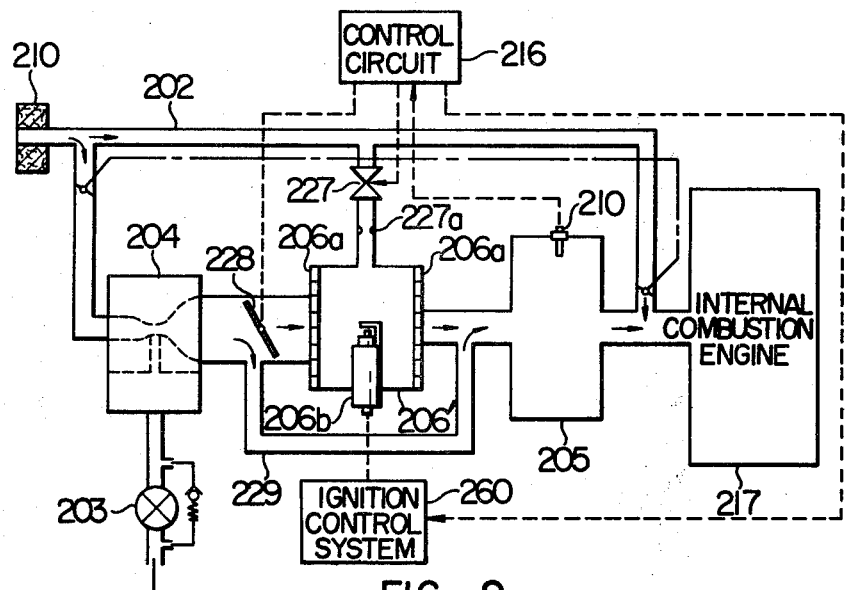
FIGS. 8 and 9 are schematic diagrams of a first and second variations thereof.

First Variation of the Third Embodiment, FIG. 8

In the third embodiment described so far in conjunction with FIG. 7, the excessively rich mixture produced in the carburetor 204 is divided to flow into the inner and outer chambers 206c and 206d in a ratio depending upon the ratio between the inlet opening areas of the inner and outer chambers 206c and 206d, but in the first variation shown in FIG. 8, a part of the excessively rich mixture flows through a by-pass pipe 229 of a burning chamber 206', and then is mixed with the combustion gases discharged from the burning chamber 206' before it is charged into the catalytic reactor 205. In order to control the ratio between the excessively rich gas charged into the burning chamber 206' and the excessively rich mixture flowing through the by-pass line 229, a switching valve 228, which is controlled in response to the output control signal from the control circuit 216, is provided. The switching valve 228 may be of the conventional type consisting of a solenoid operated valve and a butterfly valve.

When the temperature in the catalytic reactor 205 rises in excess of a predetermined level, the switching valve 228 is so actuated that almost all of the excessively rich mixture produced in the carburetor 204 is made to flow through the by-pass line 229 so as to be directly charged into the catalytic reactor 205. At the same time, the stop valve 227 is so actuated as to reduce the flow rate of the air flowing into the burning chamber.

Figure 9:
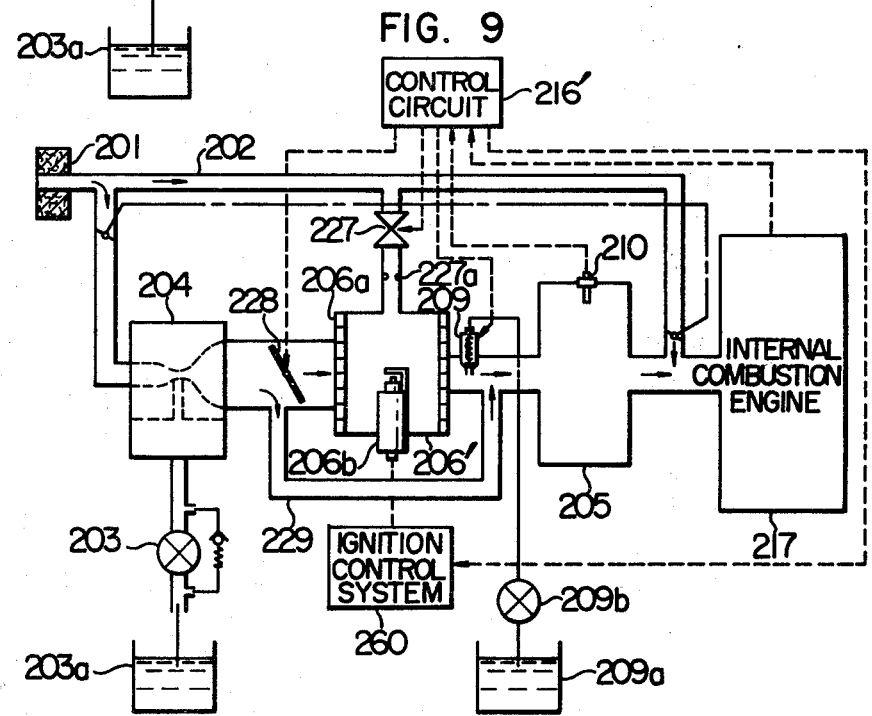

Second Variation of the Third Embodiment, FIG. 9

The second variation of the third embodiment shown in FIG. 9 is substantially similar in construction to the first variation shown in FIG. 8 except that the water from a water storage tank 209a is injected into the combustion gases discharged out of the burning chamber 206' by a water pump 209b and a water injection nozzle 209, which is controlled in response to the output control signal from the control circuit 216' as in the case of the second variation shown in FIG. 4 of the first embodiment. Since water is injected, even when the quantity of combustion gases is less, the production of carbon within the catalytic reactor 205 may be considerably reduced as compared with the first variation shown in FIG. 8. Furthermore, the chemical energy loss may be minized, and the content of hydrogen in the reformed gas may be considerably increased.

What we claim is:

1. In an internal combustion engine including an engine combustion chamber, an intake pipe for supplying at least air to said engine combustion chamber, and a throttle valve pivotally disposed in said intake pipe for controlling the amount of air passing therethrough, a fuel reforming apparatus for supplying a reformed gas including hydrogen and carbon monoxide to said engine combustion chamber of said internal combustion engine comprising:
   (i) a burning chamber for substantially burning a charge of air and a hydrocarbon fuel therein, to thereby produce heat and combustion gas;
   (ii) means coupled to said burning chamber for charging in said burning chamber said charge of air and a fuel and controlling the amount of said charge of air and a fuel in response to the amount of air passing through said intake pipe;
   (iii) a catalytic reactor having therein a catalyst for reforming hydrocarbon fuel into a reformed gas including hydrogen and carbon monoxide, said catalytic reactor being communicated with said burning chamber so that said combustion gas from said burning chamber is introduced into said catalytic reactor;
   (iv) means for supplying at least a hydrocarbon fuel to said catalytic reactor to reform said hydrocarbon fuel into the reformed gas with the aid of said heat, combustion gas and catalyst, through an endothermic reaction in said catalytic reactor; and
   (v) means communicating said catalytic reactor with said engine combustion chamber of said internal combustion engine for introducing said reformed gas thereto.

2. A fuel reforming apparatus as set forth in claim 1, further comprising,
   a spark plug disposed in said burning chamber for igniting said charge of air and a fuel.

3. A fuel reforming apparatus as set forth in claim 1, further comprising:
   temperature detecting means for detecting the temperature of said catalytic reactor and actuating said charging means to stop the charge of air and fuel when the detected temperature exceeds a predetermined value.

4. A fuel reforming apparatus as set forth in claim 1, further comprising:
   temperature detecting means for detecting the temperature of said catalytic reactor and actuating said charging means to stop the charge of air when the temperature of said catalytic reactor exceeds a predetermined value.

5. A fuel reforming apparatus as set forth in claim 1, further comprising:
   water supply means for supplying water to said catalytic reactor to facilitate reforming reaction in said catalytic reactor.

6. A fuel reforming apparatus as set forth in claim 1 further comprising a heat exchanger disposed in said communicating means and so arranged as to cool said reformed gas discharged out of said catalytic reactor.

7. A fuel reforming apparatus as set forth in claim 1 wherein the quantity of said hydrocarbon fuel charged into said burning chamber is so controlled as to be less than the quantity of said hydrocarbon fuel charged into said catalytic reactor.

8. A fuel reforming apparatus as set forth in claim 7 wherein the ratio between the hydrocarbon fuel charged into said burning chamber and the hydrocarbon fuel charged into said catalytic reactor is about 1:2.

* * * * *